US009693279B2

(12) United States Patent
Cui et al.

(10) Patent No.: US 9,693,279 B2
(45) Date of Patent: Jun. 27, 2017

(54) RADIO COMMUNICATIONS DEVICE AND SYSTEM, RADIO COMMUNICATIONS METHOD AND MACHINE READABLE MEDIUM

(71) Applicant: SONY CORPORATION, Minato-ku (JP)

(72) Inventors: Qimei Cui, Beijing (CN); Yingni Zhang, Beijing (CN); Xiaona Li, Beijing (CN); Shiyuan Li, Beijing (CN)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 14/370,412

(22) PCT Filed: Nov. 28, 2012

(86) PCT No.: PCT/CN2012/085462
§ 371 (c)(1),
(2) Date: Jul. 2, 2014

(87) PCT Pub. No.: WO2013/107220
PCT Pub. Date: Jul. 25, 2013

(65) Prior Publication Data
US 2015/0016425 A1    Jan. 15, 2015

(30) Foreign Application Priority Data
Jan. 20, 2012  (CN) .......................... 2012 1 0019978

(51) Int. Cl.
H04W 36/30    (2009.01)
H04W 76/02    (2009.01)
(Continued)

(52) U.S. Cl.
CPC ............ H04W 36/30 (2013.01); H04B 7/024 (2013.01); H04L 1/0026 (2013.01); H04W 76/025 (2013.01); H04B 7/0417 (2013.01); H04B 7/0632 (2013.01); H04B 7/0639 (2013.01); H04L 5/0035 (2013.01); H04L 2001/0093 (2013.01); H04W 72/08 (2013.01)

(58) Field of Classification Search
CPC ... H04W 36/30; H04W 24/10; H04W 76/025; H04B 7/024; H04B 7/0632; H04B 7/0639; H04L 1/0026
See application file for complete search history.

(56) References Cited

U.S. PATENT DOCUMENTS

2010/0271968 A1  10/2010  Liu et al.
2011/0237272 A1   9/2011  Gorokhov et al.
(Continued)

FOREIGN PATENT DOCUMENTS

CN   101951307    1/2011
JP   2011-82709   4/2011
(Continued)

OTHER PUBLICATIONS

Extended European Search Report issued Sep. 14, 2015 in Patent Application No. 12866121.2.
(Continued)

Primary Examiner — Edan Orgad
Assistant Examiner — Jeremy Costin
(74) Attorney, Agent, or Firm — Oblon, McClelland, Maier & Neustadt, L.L.P.

(57) ABSTRACT

An electronic device, and a method and computer readable medium, for use of subsets of coordinated multi-point (CoMP) transmission cells. The device includes processing circuitry configured to select a plurality of transmission cells as the subset of the CoMP set of transmission cells used to support wireless communications with a user equipment (UE). The processing circuitry selects the plurality of transmission cells based on a message from the UE that includes aggregate channel quality information (CQI) for at least two communication channels between the UE and corresponding transmission cells of the plurality of transmission cells.

18 Claims, 8 Drawing Sheets

(51) Int. Cl.
  *H04B 7/024*  (2017.01)
  *H04L 1/00*  (2006.01)
  *H04L 5/00*  (2006.01)
  *H04B 7/0417*  (2017.01)
  *H04B 7/06*  (2006.01)
  *H04W 72/08*  (2009.01)

(56) References Cited

U.S. PATENT DOCUMENTS

| | | |
|---|---|---|
| 2012/0088514 A1 | 4/2012 | Lee et al. |
| 2012/0106610 A1* | 5/2012 | Nogami ............... H04B 7/024 375/224 |
| 2013/0021925 A1* | 1/2013 | Yin ..................... H04B 7/024 370/252 |

FOREIGN PATENT DOCUMENTS

| | | |
|---|---|---|
| JP | 2015-511411 | 4/2015 |
| WO | WO 2010/140860 A2 | 12/2010 |
| WO | WO 2013/093786 A2 | 6/2013 |

OTHER PUBLICATIONS

International Search Report Issued Mar. 7, 2013 in PCT/CN12/085462 filed Nov. 28, 2012.

* cited by examiner

RADIO COMMUNICATIONS DEVICE AND SYSTEM, RADIO COMMUNICATIONS METHOD AND MACHINE READABLE MEDIUM

FIELD OF THE INVENTION

This disclosure relates to the field of long term evolution of the universal mobile communication system technology and in particular to an apparatus and system for wireless communication, a wireless communication method and a machine readable medium.

BACKGROUND OF THE INVENTION

Long Term Evolution (LTE) of the Universal Mobile Telecommunication System (UMTS) technology is a major new technology research and development project initiated by the $3^{rd}$ Generation Partnership Project (3GPP) in recent years. This technology has been provided with some features of the $4^{th}$ Generation communication technology and thus can also be regarded as a "quasi-4G technology". It improves and enhances the 3G air-interface access technology, adopts Orthogonal Frequency Division Multiplexing (OFDM) and Multi-Input Multi-Output (MIMO) as key technologies of its wireless network evolvement, and better addresses the problem of intra-cell interference and achieves a higher network capacity, a higher peak rate and a wider network coverage as compared with the CDMA technology. However this comes with the cost of a possibly more serious problem of Inter-cell Interference (ICI) arising in the OFDM system than the CDMA system.

The technology of Coordinated Multiple-Point (CoMP) as one of key technologies of Long Term Evolution-Advanced (LTE-A) can address effectively the ICI problem and improve significantly a cell throughput and an edge user rate. Particularly in a Joint Transmission (JT) solution in CoMP as illustrated in FIG. 1, transmission data is shared between cooperating cells, and the entire cluster of cooperating cells serves concurrently one or more User Equipments (UEs). This can eliminate interference between the respective cells but also convert the interference into a useful signal to thereby improve greatly the performance of a cell edge user equipment. For the purpose of CoMP transmission, a Base Station (BS) needs to obtain channel quality conditions between all the users and the base station in a cooperation area. For example, in the LTE system, downlink channel information is fed from a user equipment back to the base station over an uplink channel. The feedback information generally consists of two parts which are a Precoding Matrix Indicator (PMI) (reflecting channel direction information) and a Channel Quality Indicator (CQI) (reflecting channel quality information). The base station determines from the PMI a precoding scheme for data to be transmitted and determines from the CQI a modulation scheme for the data to be transmitted.

In the LTE R10, the CQI fed back from the user equipment is designed for per-cell MIMO without regard to the CoMP joint transmission scenario. It is thus desirable to design a new downlink channel information feedback solution for the CoMP joint transmission scenario.

Moreover it has not been definitely specified in the LTE R10 as to how to determine a transmission set composed of cells participating in CoMP joint transmission to the user equipment. It is thus desirable to develop a solution to determination of a transmission set for a user equipment.

SUMMARY OF THE INVENTION

An electronic device, as well as a method and computer readable medium, is described in relation to the use of subsets of coordinated multi-point (CoMP) transmission cells. The device includes processing circuitry configured to select a plurality of transmission cells as the subset of the CoMP set of transmission cells used to support wireless communications with a user equipment (UE). The processing circuitry selects the plurality of transmission cells based on a message from the UE that includes aggregate channel quality information (CQI) for at least two communication channels between the UE and corresponding transmission cells of the plurality of transmission cells.

BRIEF DESCRIPTION OF THE DRAWINGS

The invention can be better understood with reference to the description given below in conjunction with the drawings throughout which identical or similar reference numerals denote identical or similar components. The drawings together with the following detailed description are incorporated into, and form a part of, this specification and serve to further illustrate preferred embodiments of the invention and to explain the principle and advantages of the invention. In the drawings.

DETAILED DESCRIPTION OF THE INVENTION

Figure 1:
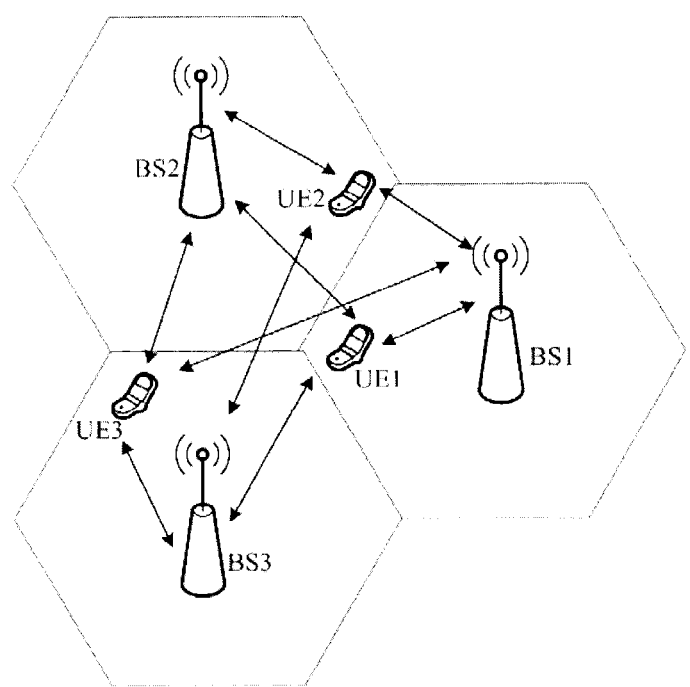
FIG. 1 illustrates a schematic diagram of the CoMP join transmission scenario.

There are two common CQI feedback schemes under ongoing 3GPP discussion. One is an individual per-cell CQI feedback scheme in which an edge user calculates and feeds back a CQI separately for each cell in a cooperating set composed of cells capable of providing a coordinated multiple-point service to a user equipment; and the other is an aggregated CQI feedback scheme in which an edge user calculates a CQI for a plurality of CoMP cells in a cooperating set according to the cooperating set and feeds back a result to a primary cell.

With respect to joint transmission, the UE receives joint transmission of the plurality of cooperating cells. An individual per-cell CQI feedback can only reflect a channel quality condition of a specific cell to the UE without embodying the feature of JT transmission. An aggregated CQI can well make up for this drawback and feed back more accurate channel qualities of the plurality of cooperating cells to the UE.

Moreover the cooperating set is typically taken directly as a transmission set under ongoing 3GPP discussion. That is, all the cells in the cooperating set participate in CoMP join transmission to the user equipment.

However efficient utilization of downlink spectrum resources have not been ensured simply by having all the cells in the cooperating set participate in JT transmission. This is because under some channel conditions, the performance of the edge UE may not have been improved significantly with the use of JT transmission, but resources of a plurality of base stations may have been occupied to thereby incur a higher waste of downlink resources, e.g., time and frequency resources.

In view of the foregoing circumstance, this disclosure proposes an apparatus and system for wireless communication, a wireless communication method and a machine readable medium in which a transmission set for a UE can be determined from among a cooperating set for the UE according to downlink channel quality information in a plurality of cooperating scenarios of the cooperating set to thereby ensure maximized utilization of downlink resources while guaranteeing commutation performance of the UE.

Embodiments of the invention will be described below with reference to the drawings. An element and a feature described in a drawing or an embodiment of the invention can be combined with an element and a feature illustrated in one or more other drawings or embodiments. It shall be noted that a representation and a description of components and processes, known to those ordinarily skilled in the art, irrelevant to the invention have been omitted in the drawings and the description for the sake of clarity.

Figure 2:
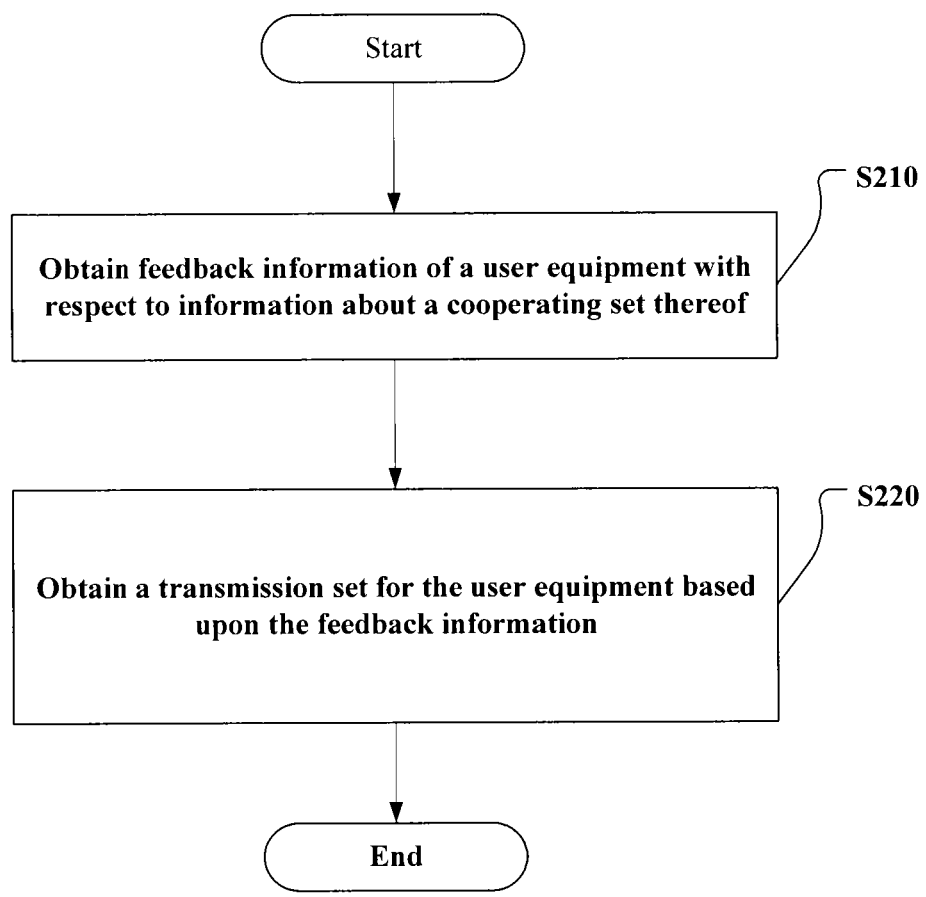
FIG. 2 illustrates a schematic flow chart of a wireless communication method according to an embodiment of this disclosure.

FIG. 2 illustrates a schematic flow chart of a wireless communication method according to an embodiment of this disclosure from the view of a base station.

As illustrated in FIG. 2, in the step S210, feedback information of a user equipment with respect to information about a cooperating set thereof is obtained. The cooperating set is composed of cells capable of providing a coordinated multiple-point service to the user equipment. At present the CoMP cooperating set can typically be determined from Reference Signal Received Power (RSRP). If the difference between RSRP of a cell k and RSRP of a servicing cell of the user equipment is below a predetermined threshold, then the cell k is determined to belong to the cooperating set for the user equipment, as expressed by Formula 1 below:

$$RSRP_{serving\_cell} - RSRP_{cell\_k} < TD_{RSRP} \quad \text{(Formula 1)}$$

Where $RSRP_{serving\_cell}$ is the reference signal received power of the servicing cell (also referred to as a primary cell) of the user equipment, $RSRP_{cell\_k}$ is the reference signal received power of the cell k, and $TD_{RSRP}$ is the preset threshold for a difference in RSRP.

Here the feedback information can be information from which a transmission set for the user equipment can be obtained. For example, the feedback information can include the channel quality information in the plurality of cooperating scenarios of the cells in the cooperating set. Alternatively the feedback information can directly include information about the transmission set determined by the user equipment. Thus in other words, the feedback information generated based upon the channel quality information is obtained. This will be described below in details.

Then in the step S220, a transmission set for the user equipment is obtained based upon the feedback information. The transmission set is composed of cells in the cooperating set, which intend to cooperate to provide joint transmission to the user equipment.

In this embodiment, the transmission set is determined based upon channel quality information in a plurality of cooperating scenarios of the cells in the cooperating set.

Here the channel quality information can be information capable of indicating a downlink channel quality but will not be limited thereto. Typically the channel quality information is represented as a Channel Quality Indicator (CQI). By way of an example without limitation thereto, in an embodiment of the disclosure, the channel quality information in each cooperating scenario can be calculated by Formula 2 below:

$$CQI_i = CQI\left(\frac{\left\|\sum_{j=1}^{P} h_j^H w_j\right\|}{I+N}\right) \quad \text{(Formula 2)}$$

Where $CQI_i$ represents a channel quality indicator in a cooperating scenario i, i represents the index of the cooperating scenario among the plurality of cooperating scenarios, j represents the index of a cell in the cooperating scenario, P represents the number of cells in the cooperating scenario, $w_j$ represents a precoding matrix for communication between the user equipment and the cell j, $h_j$ represents a channel matrix between the user equipment and the cell j, I represents interference from other cells than the cooperating set, N represents system noise, $CQI(\bullet)$ represents calculation of a channel quality indicator corresponding to a Signal to Interference plus Noise Ratio (SINR), $\|\bullet\|$ represents calculation of a norm, and $\bullet^H$ represents conjugated transposition. Here a power value of the cell j can be represented as $\|h_j^H w_j\|$.

The channel quality information is typically determined by the user equipment. The user equipment calculates received Signal to Interference plus Noise Ratios (SINRs) in joint transmission in the different cooperating scenarios according to measured matrix channel information and selected corresponding precoding matrixes respectively for communication with the respective cells, quantizes the SINRs and obtains the channel quality information in the respective cooperating scenarios by Formula 2.

It shall be appreciated that the CQI corresponding to the signal to interference plus noise ratio given in Formula 2 is merely for the purpose of an illustration. Those skilled in the art can calculate the CQI in other existing schemes, for example, can alternatively calculate the CQI corresponding to a signal to noise ratio, without limitation thereto.

In an embodiment of this disclosure, the feedback information can include the channel quality information in the plurality of cooperating scenarios of the cells in the cooperating set. In this case, the transmission set can be determined based upon the channel quality information by a party receiving the feedback information (a base station in the embodiment of this disclosure).

In an example of this embodiment, the plurality of cooperating scenarios include the following N cooperating scenarios: after the cells in the cooperating set are ranked in a descending order of power of the cells to the user equipment in a per-cell mode, the first n cells cooperate to provide joint transmission to the user equipment, where n is a positive integer and n=1, 2, . . . , N, and N is the number of cells in the cooperating set. That is, the plurality of cooperating scenarios includes: a scenario in which only the first one cell in the ranked cooperating set provides joint transmission to the user equipment, a scenario in which only the first two cells in the ranked cooperating set provide joint transmission to the user equipment, . . . , and a scenario in which only the first N cells in the ranked cooperating set provide joint transmission to the user equipment.

In this example, the transmission set of the user equipment can be determined in the following steps:

(i) One of cooperating scenarios which have an increment in channel quality information above or at a predetermined channel quality difference threshold as compared with the cooperating scenario with only the first cell and a decrement in channel quality information below the predetermined channel quality difference threshold as compared with the cooperating scenario with N cells is selected from among the plurality of cooperating scenarios; and (ii) The transmission set is formed from the cells cooperating in the selected cooperating scenario.

Optionally when all the other cooperating scenarios among the plurality of cooperating scenarios have an increment in channel quality information below the predetermined channel quality difference threshold as compared with the cooperating scenario with only the first cell, the cooperating scenario with only the first cell can be selected, and the transmission set can be formed from the first cell. At this time, communication with the user equipment transitions from the CoMP-JT configuration to the non-CoMP configuration.

Optionally when all the other cooperating scenarios among the plurality of cooperating scenarios have a decrement in channel quality information above the predetermined channel quality difference threshold as compared with the cooperating scenario with N cells, the cooperating scenario with N cells can be selected, and the transmission set can be formed from the N cells.

It shall be appreciated that the predetermined channel quality difference threshold can be determined from requirements on the performance of the user equipment (e.g., a throughput) and the spectrum utilization ratio of a network under a practical condition. For example, the channel quality difference threshold can be determined experimentally to satisfy the requirement on the performance of the user equipment and the requirement on the spectrum utilization ratio.

For the sake of convenient understanding, how to determine the transmission set based upon the channel quality information in the plurality of cooperating scenarios in the foregoing example will be further described in the following example in which a channel quality indicator is taken as the channel quality information.

If the cooperating set includes three cells, i.e., a cell 1, a cell 2 and a cell 3, where power of the cell 1 to the user equipment is above power of the cell 2 to the user equipment, and the power of the cell 2 to the user equipment is above the power of the cell 3 to the user equipment, then as can be apparent from the foregoing description, there are three cooperating scenarios of these cells, that is, a cooperating scenario 1 in which only the first cell 1 provides joint transmission to the user equipment, a cooperating scenario 2 in which the first cell 1 and the cell 2 cooperate to provide joint transmission to the user equipment, and a cooperating scenario 3 in which the first cell 1, the cell 2 and the cell 3 cooperate to provide joint transmission to the user equipment. Correspondingly the feedback information includes three corresponding CQI values (CQI1, CQI2, CQI3) calculated by Formula 2 above. The cooperating scenario 1 has an increment in channel quality information of CQI_Inc1=0 as compared with itself and a decrement in channel quality information of CQI_Dec1=CQI3−CQI1 as compared with the cooperating scenario 3. The cooperating scenario 2 has an increment in channel quality information of CQI_Inc2=CQI2−CQI1 as compared with the cooperating scenario 1 and a decrement in channel quality information of CQI_Dec2=CQI3−CQI2 as compared with the cooperating scenario 3. The cooperating scenario 3 has an increment in channel quality information of CQI_Inc3=CQI3−CQI1 as compared with the cooperating scenario 1 and a decrement in channel quality information of CQI_Dec3=0 as compared with itself Assuming that the channel quality difference threshold is $\lambda$, and it is determined that CQI_Inc1<$\lambda$ and CQI_Dec1>$\lambda$; CQI_Inc2>$\lambda$ and CQI_Dec2<$\lambda$; and CQI_Inc3>$\lambda$ and CQI_Dec3<$\lambda$, that is, both the cooperating scenario 2 and the cooperating scenario 3 satisfy the foregoing selection condition, then either of the cooperating scenario 2 and the cooperating scenario 3 can be selected, and the transmission set can be formed from the cells in the selected cooperating scenario.

In another case, assuming that the channel quality difference threshold is $\lambda$, and it is determined that CQI_Inc2<$\lambda$ and CQI_Dec2<$\lambda$, then the cooperating scenario 1 is selected, that is, the transmission set is formed from only the cell 1 and represented as {Cell 1}.

In still another case, assuming that the channel quality difference threshold is $\lambda$, and it is determined that CQI_Dec1>$\lambda$ and CQI_Dec2>$\lambda$, then the cooperating scenario 3 is selected, that is, the transmission set is formed from all the cell 1, the cell 2 and the cell3 and represented as {Cell 1, Cell 2, Cell 3}.

In the foregoing example, preferably a cooperating scenario with the lowest number of cells among the cooperating scenarios which have an increment in channel quality information above or at the predetermined channel quality difference threshold as compared with the cooperating scenario with only the first cell and a decrement in channel quality information below the predetermined channel quality difference threshold as compared with the cooperating scenario with N cells can be selected from among the plurality of cooperating scenarios. Thus the utilization ratio of spectrum resources can be improved as much as possible by lowering the number of cooperating cells for joint transmission as much as possible while satisfying the requirements on the performance and the utilization ratio of spectrum resources.

According to this preferred embodiment, in the foregoing example, again assuming that the channel quality difference threshold is $\lambda$, and it is determined that CQI_Inc1<$\lambda$ and CQI_Dec1>$\lambda$; CQI_Inc2>$\lambda$ and CQI_Dec2<$\lambda$; and CQI_Inc3>$\lambda$ and CQI_Dec3<$\lambda$, then the cooperating scenario 2 can be selected, and the transmission set can be formed from the cells in the cooperating scenario 2.

In another example of this embodiment, the plurality of cooperating scenarios include all the cooperating scenarios of the cells in the cooperating set. For example, when the cooperating set includes n cells, the plurality of cooperating scenarios include n cooperating scenarios with only one cell, $C_n^2$ cooperating scenarios with two cooperating cells, . . . , and $C_n^n$ cooperating scenarios with n cooperating cells (that is, only one cooperating scenario).

In this example, the transmission set of the user equipment can be determined in the following steps:

(i) One of cooperating scenarios with the channel quality information above or at a predetermined channel quality threshold is selected among all the cooperating scenarios; and (ii) The transmission set is formed from the cells cooperating in the selected cooperating scenario.

It shall be appreciated that the predetermined channel quality threshold can be determined from requirements on the performance of the user equipment (e.g., a throughput) and the spectrum utilization ratio of a network under a practical condition. For example, the channel quality threshold can be determined experimentally to satisfy the requirement on the performance of the user equipment and the requirement on the spectrum utilization ratio.

In this example, there may be numerous cooperating scenarios with the channel quality information above or at the predetermined channel quality threshold. Preferably a cooperating scenario with the lowest number of cells among the cooperating scenarios with the channel quality information above or at the predetermined channel quality threshold can be selected from among all the cooperating scenarios. Thus the utilization ratio of spectrum resources can be improved as much as possible by lowering the number of cooperating cells for joint transmission as much as possible while satisfying the requirements on the performance and the utilization ratio of spectrum resources.

The two examples given above of the plurality of cooperating scenarios are merely for the purpose of an illustration. Those skilled in the art can configure other numerous cooperating scenarios in light of the foregoing description to determine a transmission set based upon channel quality information corresponding to the numerous cooperating scenarios.

In another embodiment of this disclosure, the feedback information can include information about the transmission set determined by the user equipment. In this case, a party receiving the feedback information (a base station in the embodiment of this disclosure) can obtain the transmission set directly based upon the feedback information. The user equipment can determine the transmission set based upon the channel quality information in the plurality of cooperating scenarios in the same method as the foregoing embodiment, and a repeated description thereof will be omitted here.

Moreover in a practical communication flow, the feedback information can further include corresponding channel direction indication information in a per-cell mode of each cell in the cooperating set. The channel direction indication information is a Precoding Matrix Index (PMI), for example. The base station can determine from the value of the PMI a precoding matrix for communication with the user equipment. Reference can be made to the relevant specification in the LTE R10 for calculation of the value of a PMI, and a repeated description thereof will be omitted here.

Figure 3:
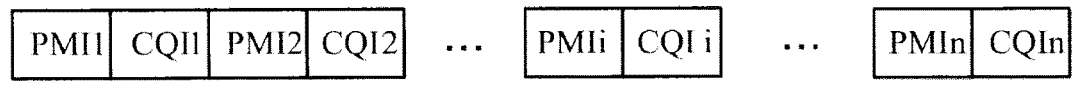
FIG. 3 illustrates a schematic diagram of a feedback information format according to an embodiment of this disclosure.

When the feedback information further includes channel direction indication information, the channel direction indication information and the channel quality information can be arranged alternately in the feedback information. By way of an example, FIG. 3 illustrates a schematic diagram of a feedback information format according to an embodiment of this disclosure. As illustrated, PMI1, PMI2, . . . , PMIi, . . . , PMIn represent the channel direction indication information in a per-cell mode of the cell 1, the cell 2, . . . , the cell i, . . . , the cell n in the cooperating set respectively. CQI1, CQI2, . . . , CQIi, . . . , CQIn represent the channel quality information in the plurality of cooperating scenarios with 1, 2, . . . , i, . . . , n cells respectively.

When the plurality of cooperating scenarios include all the cooperating scenarios of the cells in the cooperating set, for example, the channel quality information in cooperating scenarios with the same number of cells are arranged together in parallel. In this case, CQIi can represent the arranged channel quality information in parallel in a cooperating scenario with i cells.

After the transmission set is determined, base stations corresponding to the respective cells in the transmission set can precode data to be transmitted to the user equipment by the precoding matrixes indicated by the corresponding PMIs, and modulate the precoded data by the channel quality information in the cooperating scenario with the cells in the transmission set, and then perform CoMP joint transmission of the coded and modulated data to the user equipment.

The arrangement given here of channel direction indication information and the channel quality information in the feedback information is merely for the purpose of an illustration. Those skilled in the art can design various other suitable feedback information formats under a practical condition in light of the foregoing description.

An apparatus for wireless communication according to an embodiment of this disclosure (a base station in the embodiment of this disclosure) will be described below with reference to FIG. 4 and FIG. 5.

Figure 4:
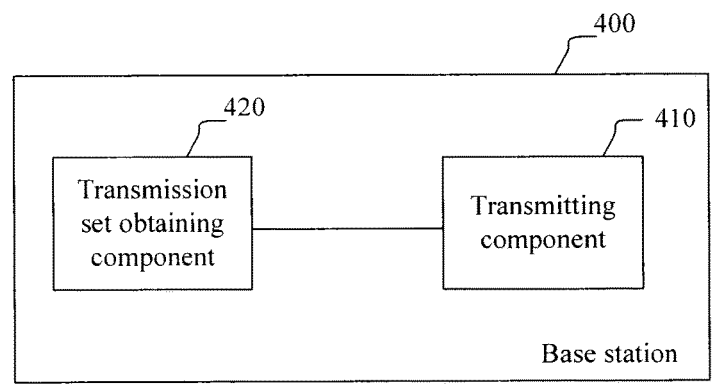
FIG. 4 illustrates a schematic block diagram of an apparatus for wireless communication according to an embodiment of this disclosure.
Figure 5:
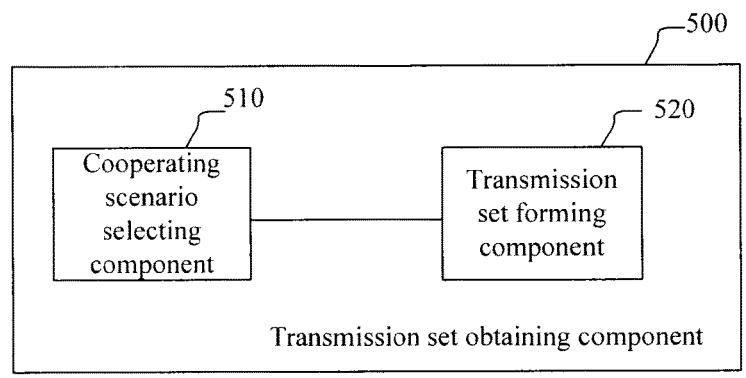
FIG. 5 illustrates a schematic block diagram of a transmission set obtaining component in the apparatus for wireless communication according to the embodiment of this disclosure.

FIG. 4 illustrates a schematic block diagram of an apparatus for wireless communication according to an embodiment of this disclosure. Those skilled in the art shall appreciate other possible components of the apparatus for wireless communication have been omitted in FIG. 4 so as not to obscure the spirit and scope of the invention. As illustrated in FIG. 4, the apparatus 400 for wireless communication includes a transmitting component 410 and a transmission set obtaining component 420. The transmitting component 410 is configured to obtain feedback information of a user equipment with respect to information about a cooperating set thereof, where the cooperating set is composed of cells capable of providing a coordinated multiple-point service to the user equipment. The transmission set obtaining component 420 is configured to obtain a transmission set for the user equipment based upon the feedback information, where the transmission set is composed of cells in the cooperating set, which intend to cooperate to provide joint transmission to the user equipment. Particularly the transmission set is determined based upon channel quality information in a plurality of cooperating scenarios of the cells in the cooperating set.

According to an embodiment of this disclosure, the feedback information includes the channel quality information in the plurality of cooperating scenarios of the cells in the cooperating set, and the transmission set obtaining component 420 is further configured to determine the transmission set based upon the channel quality information.

In an example of the embodiment, the plurality of cooperating scenarios include the following N cooperating scenarios: after the cells in the cooperating set are ranked in a descending order of power of the cells to the user equipment in a per-cell mode, the first n cells cooperate to provide joint transmission to the user equipment, where n is a positive integer and n=1, 2, . . . , N, and N is the number of cells in the cooperating set. FIG. 5 illustrates a schematic block diagram of the transmission set obtaining component in the apparatus for wireless communication according to this example. The transmission set obtaining component 500 includes a cooperating scenario selecting component 510 and a transmission set forming component 520. The cooperating scenario selecting component 510 is configured to select from among the plurality of cooperating scenarios one of cooperating scenarios which have an increment in channel quality information above or at a predetermined channel quality difference threshold as compared with the cooperating scenario with only the first cell and a decrement in channel quality information below the predetermined channel quality difference threshold as compared with the cooperating scenario with the N cells. The transmission set forming component 520 is configured to form the transmission set from the cells cooperating in the selected cooperating scenario.

Optionally when all the other cooperating scenarios among the plurality of cooperating scenarios have an increment in channel quality information below the predetermined channel quality difference threshold as compared with the cooperating scenario with only the first cell, the cooperating scenario selecting component 510 selects the cooperating scenario with only the first cell, and the transmission set forming component 520 forms the transmission set from the first cell.

Optionally when all the other cooperating scenarios among the plurality of cooperating scenarios have a decrement in channel quality information above the predetermined channel quality difference threshold as compared with the cooperating scenario with N cells, the cooperating scenario selecting component 510 selects the cooperating scenario with N cells, and the transmission set forming component 520 forms the transmission set from the N cells.

Preferably the cooperating scenario selecting component 510 is further configured to select from among the plurality of cooperating scenarios a cooperating scenario with the lowest number of cells among the cooperating scenarios which have an increment in channel quality information above or at the predetermined channel quality difference threshold as compared with the cooperating scenario with only the first cell and a decrement in channel quality information below the predetermined channel quality difference threshold as compared with the cooperating scenario with N cells.

In another example of the embodiment, the plurality of cooperating scenarios include all the cooperating scenarios of the cells in the cooperating set. In this example, the transmission set obtaining component can also include a cooperating scenario selecting component and a transmission set forming component (structurally the same as in FIG. 5 but not illustrated), where the cooperating scenario selecting component is configured to select among all the cooperating scenarios one of cooperating scenarios with the channel quality information above or at a predetermined channel quality threshold, and the transmission set forming component is configured to form the transmission set from the cells cooperating in the selected cooperating scenario.

In this example, preferably the cooperating scenario selecting component is further configured to select among all the cooperating scenarios a cooperating scenario with the lowest number of cells among the cooperating scenarios with the channel quality information above or at the predetermined channel quality threshold.

According to another embodiment of this disclosure, the feedback information includes information about the transmission set determined by the user equipment.

According to another embodiment of this disclosure, the feedback information further includes corresponding channel direction indication information in a per-cell mode of each cell in the cooperating set.

According to another embodiment of this disclosure, the channel quality information in each cooperating scenario can be calculated by Formula 2 above.

For further detailed operations of each component in the apparatus for wireless communication according to the foregoing embodiments of this disclosure, reference can be made to the foregoing description of the method of transmitting the transmission set for the user equipment according to the embodiments of this disclosure from the view of the base station, and a repeated description thereof will be omitted here.

Figure 6:
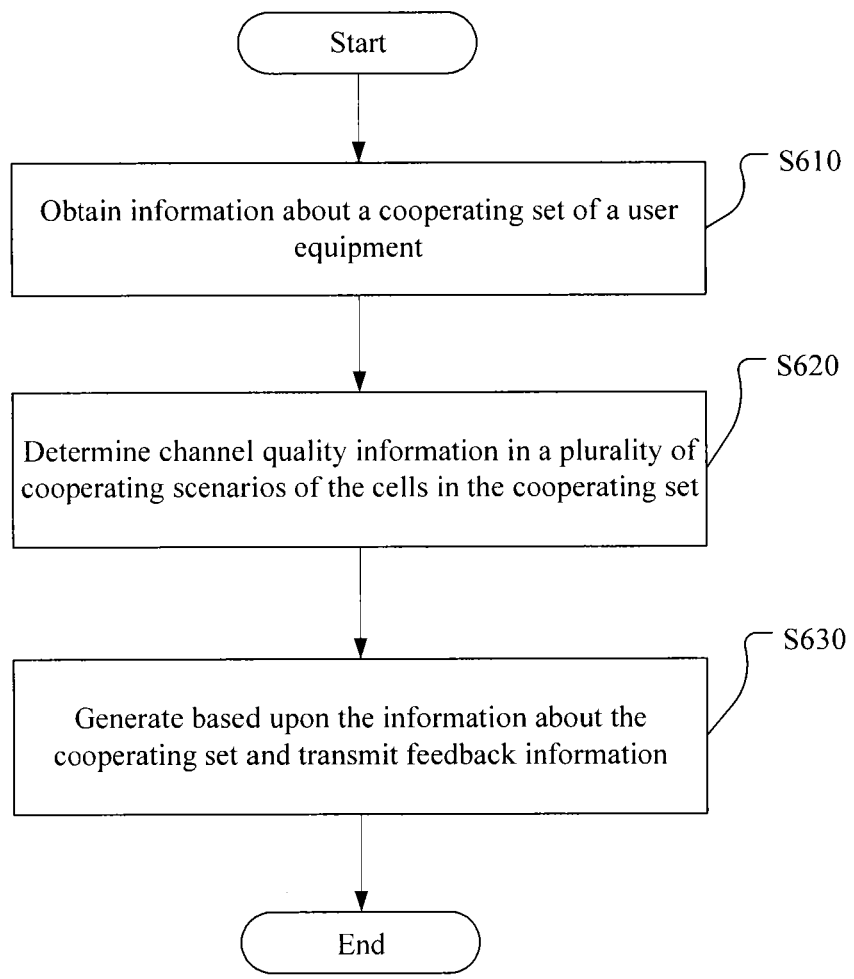
FIG. 6 illustrates a schematic flow chart of a wireless communication method according to another embodiment of this disclosure.

FIG. 6 illustrates a schematic flow chart of a wireless communication method according to another embodiment of this disclosure from the view of a user equipment.

As illustrated in FIG. 6, in the step S610, information about a cooperating set of a user equipment is obtained, where the cooperating set is composed of cells capable of providing a coordinated multiple-point service to the user equipment. The cells in the cooperating set can be determined by Formula 1 above, for example.

In the step S620, channel quality information in a plurality of cooperating scenarios of the cells in the cooperating set is determined.

According to an embodiment of this disclosure, the method further includes determining the following N cooperating scenarios as the plurality of cooperating scenarios: after the cells in the cooperating set are ranked in a descending order of power of the cells to the user equipment in a per-cell mode, the first n cells cooperate to provide joint transmission to the user equipment, where n is a positive integer and n=1, 2, . . . , N, and N is the number of cells in the cooperating set.

According to another embodiment of this disclosure, the method further includes determining all the scenarios of the cells in the cooperating set as the plurality of cooperating scenarios.

The respective channel quality information in the plurality of cooperating scenarios can be calculated in a suitable method. For example, when the channel quality information is a CQI, the CQI in each cooperating scenario can be calculated by Formula 2 above.

Moreover the embodiments given above of the plurality of cooperating scenarios are merely for the purpose of an illustration. Those skilled in the art can configure other numerous cooperating scenarios in light of the foregoing description to determine a transmission set based upon channel quality information in the numerous cooperating scenarios.

Next in the step S630, feedback information is generated based upon the information about the cooperating set and transmitted so that a base station can obtain the transmission set for the user equipment based upon the feedback information. The transmission set for the user equipment can be obtained based upon the feedback information. For example, the feedback information can include the channel quality information in the plurality of cooperating scenarios of the cells in the cooperating set. Alternatively the feedback information can include information about the transmission set determined by the user equipment directly based upon the channel quality information. Thus in other words, the feedback information is generated based upon the channel quality information in the plurality of cooperating scenarios of the cells in the cooperating set.

In this embodiment, the transmission set is determined based upon the channel quality information.

According to an embodiment of this disclosure, the feedback information includes the channel quality information in the plurality of cooperating scenarios of the cells in the cooperating set. In this case, the transmission set can be determined by the base station based upon the feedback information. The method further includes obtaining information about the transmission set.

According to another embodiment of this disclosure, the method further includes determining the transmission set for the user equipment based upon the channel quality information in the plurality of cooperating scenarios of the cells in the cooperating set. In this embodiment, the feedback information includes the information about the determined transmission set. That is, the user equipment itself determines a transmission set and notifies the base station of information about the transmission set. The transmission set can be determined as in the transmission set determining step above in the embodiment of the method described from the view of the base station, and a repeated description thereof will be omitted here.

An apparatus for wireless communication according to an embodiment of this disclosure (a user equipment in the embodiment of this disclosure) will be described below with reference to FIG. 7 and FIG. 8.

Figure 7:
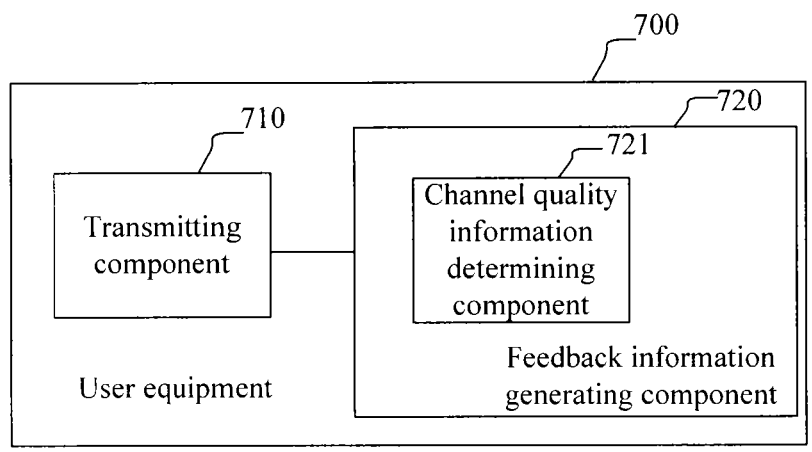
FIG. 7 illustrates a schematic block diagram of an apparatus for wireless communication according to an embodiment of this disclosure.
Figure 8:
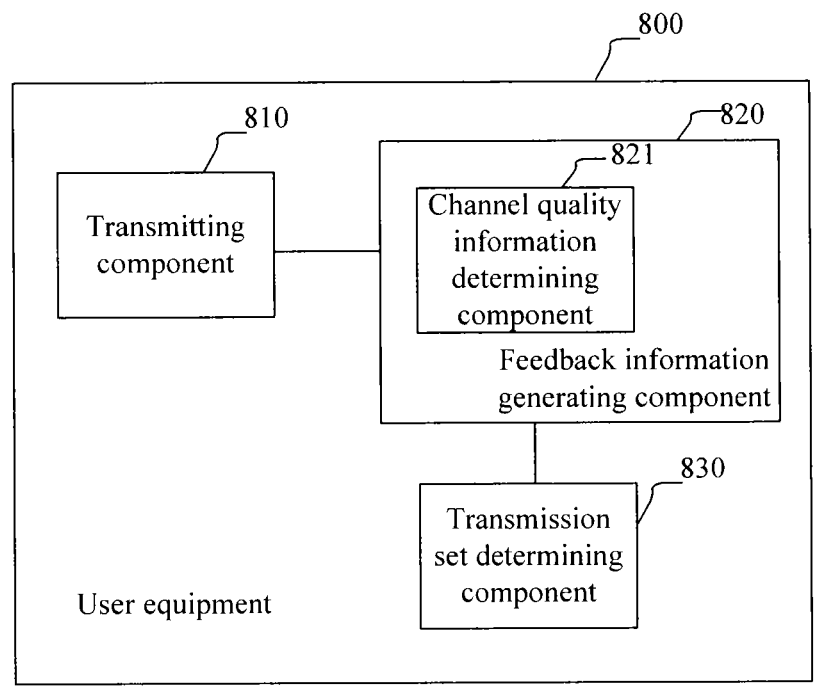
FIG. 8 illustrates a schematic block diagram of an apparatus for wireless communication according to another embodiment of this disclosure.

FIG. 7 illustrates a schematic block diagram of an apparatus for wireless communication according to an embodiment of this disclosure. Those skilled in the art shall appreciate other possible components of the apparatus for wireless communication have been omitted in FIG. 7 so as not to obscure the spirit and scope of the invention. As illustrated in FIG. 7, the apparatus 700 for wireless communication includes a transmitting component 710 and a feedback information generating component 720. The transmitting component 710 is configured to obtain information about a cooperating set of a user equipment and to transmit feedback information of the user equipment with respect to the information about the cooperating set thereof, where the cooperating set is composed of cells capable of providing a coordinated multiple-point service to the user equipment. The feedback information generating component 720 is configured to generate the feedback information based upon the information about the cooperating set, where a transmission set for the user equipment can be obtained based upon the feedback information, and the transmission set is composed of cells in the cooperating set, which intend to cooperate to provide joint transmission to the user equipment. In this embodiment, the transmission set is determined based upon channel quality information in a plurality of cooperating scenarios of the cells in the cooperating set. Moreover the feedback information generating component 720 includes a channel quality information determining component 721 configured to determine the channel quality information in the plurality of cooperating scenarios of the cells in the cooperating set.

According to another embodiment of this disclosure, the feedback information includes the channel quality information in the plurality of cooperating scenarios of the cells in the cooperating set, and the transmitting component 710 is further configured to obtain information about the transmission set.

According to another embodiment of this disclosure, the channel quality information determining component 721 is further configured to determine the following N cooperating scenarios as the plurality of cooperating scenarios: after the cells in the cooperating set are ranked in a descending order of power of the cells to the user equipment in a per-cell mode, the first n cells cooperate to provide joint transmission to the user equipment, where n is a positive integer and n=1, 2, . . . , N, and N is the number of cells in the cooperating set.

According to another embodiment of this disclosure, the channel quality information determining component 721 is further configured to determine all the scenarios of the cells in the cooperating set as the plurality of cooperating scenarios.

According to another embodiment of this disclosure, the user equipment can determine the transmission set based upon the channel quality information and notify a base station of feedback information about the determined transmission set. FIG. 8 illustrates a schematic block diagram of an apparatus for wireless communication according to such an embodiment. As illustrated in FIG. 8, the apparatus for wireless communication 800 further includes a transmission set determining component 830 configured to determine the transmission set based upon the channel quality information in addition to a transmitting component 810 and a feedback information generating component 820. The transmitting component 810 and the feedback information generating component 820 are functionally substantially the same as the transmitting component 710 and the feedback information generating component 720, and a repeated description thereof will be omitted here.

Figure 9:
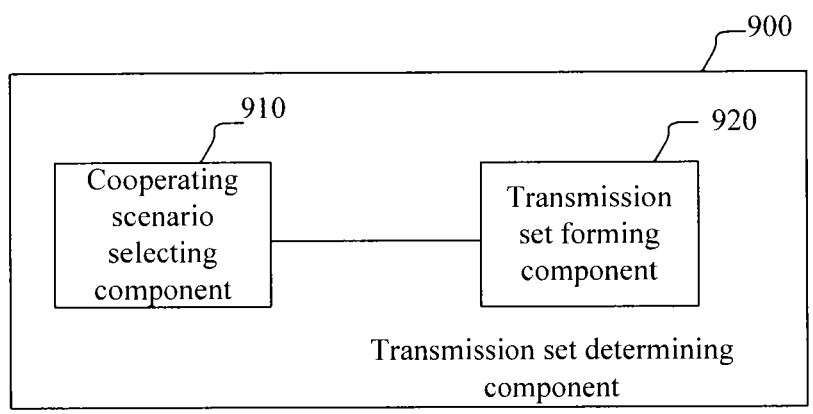
FIG. 9 illustrates a schematic block diagram of a transmission set determining component in the apparatus for wireless communication according to the other embodiment of this disclosure.

According to another embodiment of this disclosure, the channel quality information determining component 821 is further configured to determine the following N cooperating scenarios as the plurality of cooperating scenarios: after the cells in the cooperating set are ranked in a descending order of power of the cells to the user equipment in a per-cell mode, the first n cells cooperate to provide joint transmission to the user equipment, where n is a positive integer and n=1, 2, . . . , N, and N is the number of cells in the cooperating set. FIG. 9 illustrates a schematic block diagram of the transmission set determining component in the apparatus for wireless communication according to this embodiment. As illustrated in FIG. 9, the transmission set determining component 900 further includes a cooperating scenario selecting component 910 and a transmission set forming component 920. The cooperating scenario selecting component 910 is configured to select from among the plurality of cooperating scenarios one of cooperating scenarios which have an increment in channel quality information above or at a predetermined channel quality difference threshold as compared with the cooperating scenario with only the first cell and a decrement in channel quality information below the predetermined channel quality difference threshold as compared with the cooperating scenario with N cells. The transmission set forming component 920 is configured to form the transmission set of the user equipment from the cells cooperating in the selected cooperating scenario.

Optionally when all the other cooperating scenarios among the plurality of cooperating scenarios have an increment in channel quality information below the predetermined channel quality difference threshold as compared with the cooperating scenario with only the first cell, the cooperating scenario selecting component 910 selects the cooperating scenario with only the first cell, and the transmission set forming component 920 forms the transmission set from the first cell.

Optionally when all the other cooperating scenarios among the plurality of cooperating scenarios have a decrement in channel quality information above the predetermined channel quality difference threshold as compared with the cooperating scenario with N cells, the cooperating scenario selecting component 910 selects the cooperating scenario with N cells, and the transmission set forming component 920 forms the transmission set from the N cells.

Preferably the cooperating scenario selecting component 910 is further configured to select from among the plurality of cooperating scenarios a cooperating scenario with the lowest number of cells among the cooperating scenarios which have an increment in channel quality information above or at the predetermined channel quality difference threshold as compared with the cooperating scenario with only the first cell and a decrement in channel quality information below the predetermined channel quality difference threshold as compared with the cooperating scenario with N cells.

According to another embodiment of this disclosure, the channel quality information determining component 821 is further configured to determine all the cooperating scenarios of the cells in the cooperating set as the plurality of cooperating scenarios. In this embodiment, the transmission set determining component 830 can also include a cooperating scenario selecting component and a transmission set forming component (structurally the same as in FIG. 9 but not illustrated), where the cooperating scenario selecting component is configured to select among all the cooperating scenarios one of cooperating scenarios with the channel quality information above or at a predetermined channel quality threshold, and the transmission set forming component is configured to form the transmission set from the cells cooperating in the selected cooperating scenario.

Preferably the cooperating scenario selecting component is further configured to select among all the cooperating scenarios a cooperating scenario with the lowest number of cells among the cooperating scenarios with the channel quality information above or at the predetermined channel quality threshold.

According to an embodiment of this disclosure, the channel quality information determining component (721, 821) calculates the channel quality information in each cooperating scenario by Formula 2 above.

For further detailed operations of each component in the user equipment according to the foregoing embodiments of this disclosure, reference can be made to the foregoing description of the wireless communication method according to the embodiments of this disclosure from the view of the user equipment, and a repeated description thereof will be omitted here.

Figure 10:
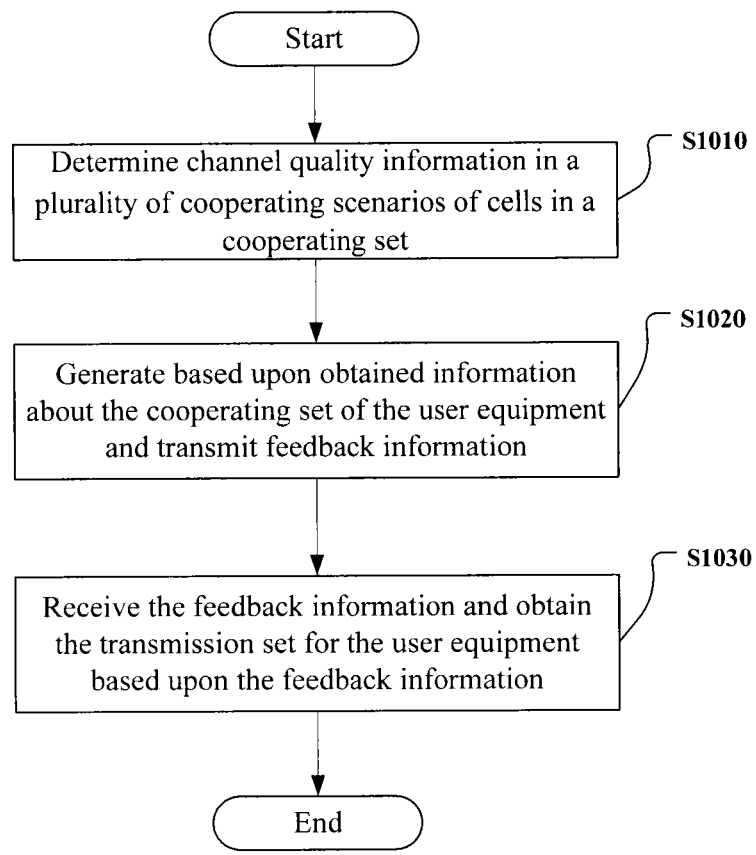
FIG. 10 illustrates a schematic flow chart of a wireless communication method according to another embodiment of this disclosure.

FIG. 10 illustrates a schematic flow chart of a wireless communication method according to another embodiment of this disclosure from the view of a system for wireless communication.

As illustrated in FIG. 10, in the step S1010, a user equipment determines channel quality information in a plurality of cooperating scenarios of cells in a cooperating set.

In the step S1020, the user equipment generates based upon obtained information about the cooperating set of the user equipment and transmits feedback information. The cooperating set is composed of cells capable of providing a coordinated multiple-point service to the user equipment. A transmission set for the user equipment can be obtained based upon the feedback information. For example, the feedback information can include the channel quality information in the plurality of cooperating scenarios of the cells in the cooperating set. Alternatively the feedback information can directly include information about the transmission set determined by the user equipment based upon the channel quality information. Thus in other words, the user equipment generates the feedback information based upon the channel quality information in the plurality of cooperating scenarios of the cells in the cooperating set.

In the step S1030, the feedback information is received, and the transmission set for the user equipment is obtained based upon the feedback information. The transmission set is composed of cells in the cooperating set, which intend to cooperate to provide joint transmission to the user equipment.

Particularly the transmission set is determined based upon the channel quality information in the plurality of cooperating scenarios of the cells in the cooperating set.

For further details of the method according to the foregoing embodiment of this disclosure, reference can be made to the foregoing descriptions of the wireless communication methods according to the embodiments of this disclosure from the view of the user equipment and from the view of the base station, and a repeated description thereof will be omitted here.

Figure 11:
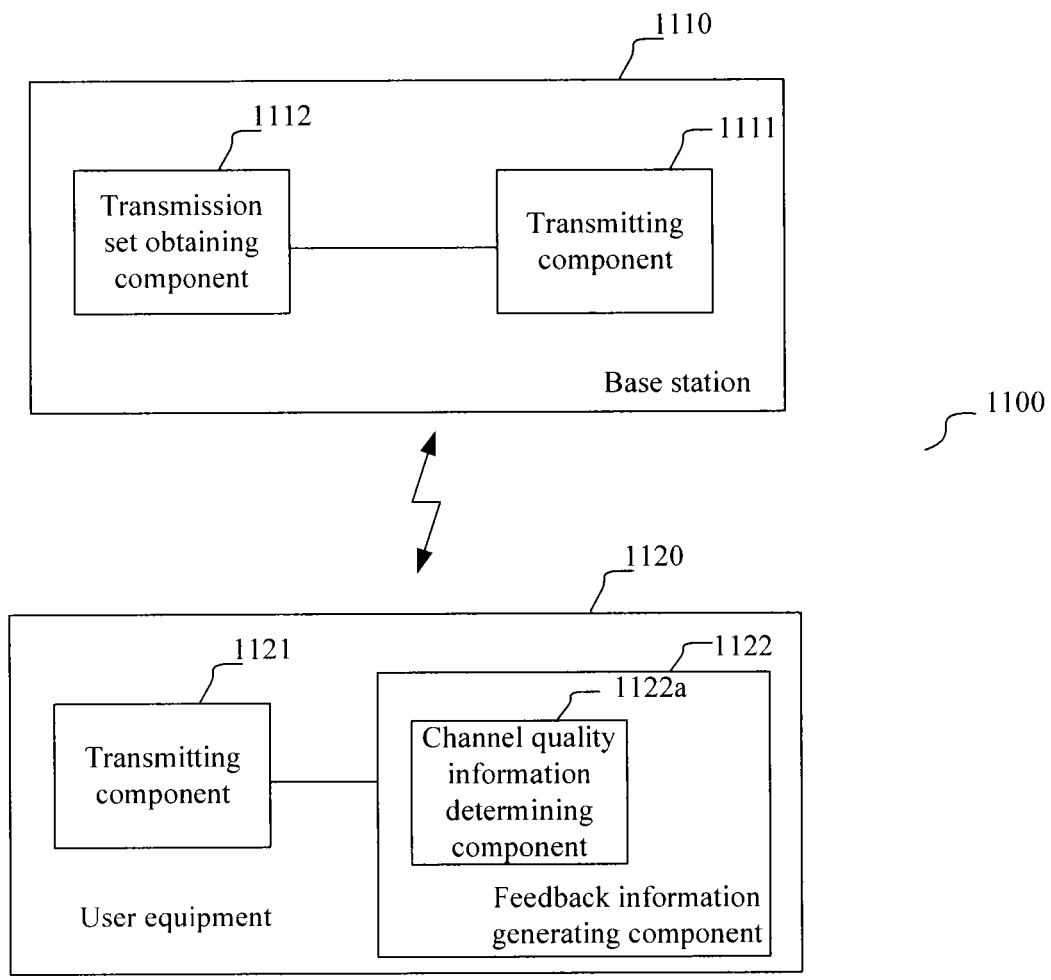
FIG. 11 illustrates a schematic block diagram of a system for wireless communication according to an embodiment of this disclosure.

FIG. 11 illustrates a schematic block diagram of a system for wireless communication according to an embodiment of this disclosure. The system for wireless communication is composed of the base station and the user equipment according to the embodiments of the invention. As illustrated in FIG. 11, the system 1100 for wireless communication includes a base station 1110 and a user equipment 1120, where the base station 1110 includes a transmitting component 1111 (a first transmitting component) and a transmission set obtaining component 1112. The transmitting component 1111 is configured to obtain feedback information of the user equipment with respect to information about a cooperating set thereof, where the cooperating set is composed of cells capable of providing a coordinated multiple-point service to the user equipment 1120. The transmission set obtaining component 1112 is configured to obtain a transmission set for the user equipment 1120 based upon the feedback information, where the transmission set is composed of cells in the cooperating set, which intend to cooperate to provide joint transmission to the user equipment. The user equipment 1120 includes: a transmitting component 1121 (a second transmitting component) configured to obtain the information about the cooperating set of the user equipment and to transmit the feedback information of the user equipment with respect to the information about the cooperating set thereof; and a feedback information generating component 1122 configured to generate the feedback information based upon the information about the cooperating set, where the transmission set for the user equipment 1120 can be obtained based upon the feedback information. Particularly the transmission set is determined based upon channel quality information in a plurality of cooperating scenarios of the cells in the cooperating set. And the feedback information generating component 1122 includes a channel quality information determining component 1122*a* configured to determine the channel quality information in the plurality of cooperating scenarios of the cells in the cooperating set.

For further detailed operations of each component in the system for wireless communication according to the foregoing embodiment of this disclosure, reference can be made to the foregoing descriptions of the base station and the user equipment according to the embodiments of this disclosure, and a repeated description thereof will be omitted here.

In the apparatus and system for wireless communication, wireless communication method and machine readable medium according to the embodiments of this disclosure, a transmission set for a user equipment can be determined from among a cooperating set for the user equipment according to channel quality information in a plurality of cooperating scenarios of the cooperating set to thereby ensure maximized utilization of downlink resources while guaranteeing commutation performance of the user equipment.

It shall be appreciated that the respective components and units in the respective apparatuses according to the embodiments of this disclosure can be configured in software, firmware, hardware or any combination thereof. A particular configuration means or manner available is well known to those skilled in the art, and a repeated description thereof will be omitted here. In the case of being embodied in software or firmware, programs constituting the software can be installed from a storage medium or a network to a computer with a dedicated hardware structure, and the computer can perform the various functions when the various pieces of programs are installed thereon.

Figure 12:
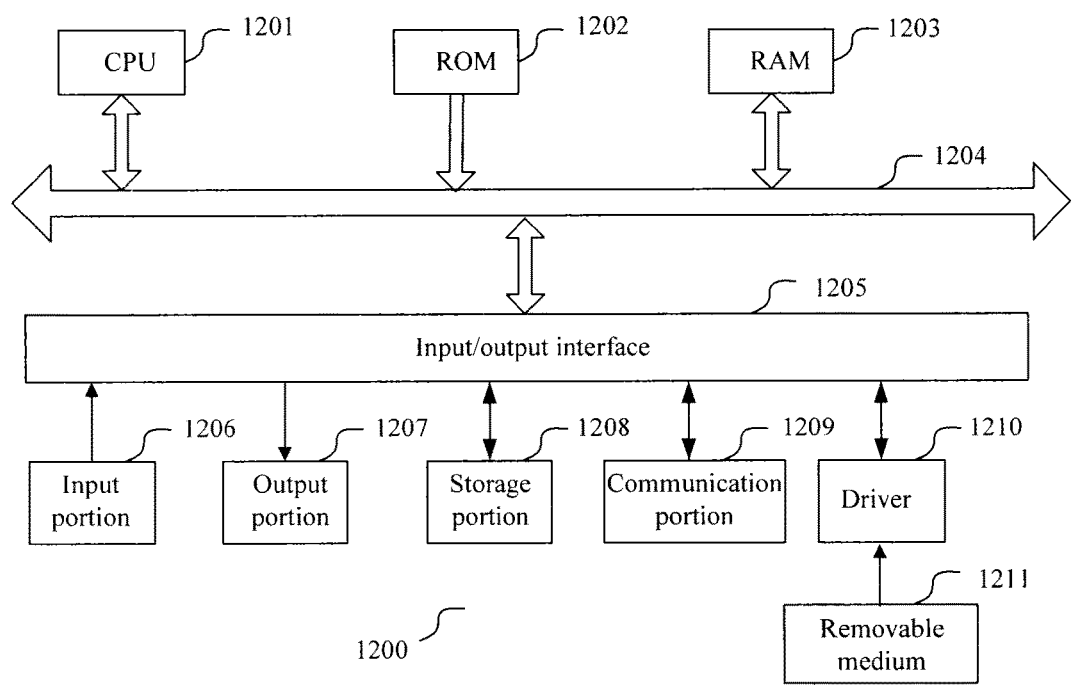
FIG. 12 illustrates an exemplary block diagram of the structure of a computer in which the embodiments/examples of this disclosure can be embodied.

FIG. 12 illustrates an exemplary block structural diagram of a computer in which the embodiments/examples of this disclosure can be embodied. In FIG. 12, a Central Processing Unit (CPU) 1201 performs various processes according to programs stored in a Read Only Memory (ROM) 1202 or loaded from a storage portion 1208 into a Random Access Memory (RAM) 1203 in which data required when the CPU 1201 performs the various processes, etc., are also stored as needed. The CPU 1201, the ROM 1202 and the RAM 1203 are connected to each other via a bus 1204 to which an input/output interface 1205 is also connected.

The following components are connected to the input/output interface 1205: an input portion 1206 (including a keyboard, a mouse, etc.); an output portion 1207 (including a display, e.g., a Cathode Ray Tube (CRT), a Liquid Crystal Display (LCD), etc., a speaker, etc.); a storage port 1208 (including a hard disk, etc.); and a communication portion 1209 (including a network interface card, e.g., an LAN card, a modem, etc). The communication portion 1209 performs a communication process over a network, e.g., the Internet. A driver 1210 is also connected to the input/output interface 1205 as needed. A removable medium 1211, e.g., a magnetic disk, an optical disk, an optic-magnetic disk, a semiconductor memory, etc., can be installed on the driver 1210 as needed so that computer programs read therefrom can be installed into the storage portion 1208 as needed.

In the case that the foregoing series of processes are performed in software, programs constituting the software can be installed from a network, e.g., the Internet, etc., or a storage medium, e.g., the removable medium 1211, etc.

Those skilled in the art shall appreciate that such a storage medium will not be limited to the removable medium 1211 illustrated in FIG. 12 in which the programs are stored and which is distributed separately from the apparatuses to provide a user with the programs. Examples of the removable medium 1211 include a magnetic disk (including a Floppy Disk (a registered trademark)), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 1202, a hard disk included in the storage port 1208, etc., in which the programs stored and which is distributed together with the apparatuses including the same to the user.

This disclosure further proposes a program product with machine readable instruction codes stored thereon. The instruction codes can perform upon being read and executed by a machine the wireless communication methods above according to the embodiments of this disclosure.

Correspondingly a storage medium carrying the program product with the machine readable instruction codes stored thereon will also come into the scope of this disclosure. The storage medium can include but will not be limited to a floppy disk, an optical disk, an optic-magnetic disk, a memory card, a memory stick, etc.

In the foregoing description of the embodiments of this disclosure, a feature described and/or illustrated with respect to an implementation can be used identically or similarly in one or more other implementations in combination with or in place of a feature in the other implementation(s).

It shall be emphasized that the term "include/comprise" as used in this context refers to the presence of a feature, an element, a step or a component but will not preclude the presence or addition of one or more other features, elements, steps or components.

Furthermore the methods according to this disclosure may not necessarily be performed in a chronological order described in the specification but can alternatively be performed in another chronological order sequentially, concurrently or separately. Therefore the technical scope of the invention will not be limited by the orders in which the methods are performed as described in the specification.

Although the embodiments of this disclosure have been described above with reference to the drawings, it shall be appreciated that all the embodiments above are illustrative of but not limiting the invention. Those skilled in the art can make various modifications and changes to the embodiments above without departing from the spirit and scope of the invention. Accordingly the scope of the invention will be defined only by the appended claims and their equivalents.

What is claimed is:

1. An electronic device comprising:
processing circuitry including a processor and a memory coupled to the processor, the processing circuitry configured to:
select a plurality of transmission cells as a subset of a coordinated multi-point (CoMP) set of transmission cells used to support wireless communications with a user equipment (UE), wherein
the processing circuitry selects the plurality of transmission cells based on a message from the UE that includes aggregate channel quality information (CQI) for at least two communication channels between the UE and corresponding transmission cells of the plurality of transmission cells, the aggregate CQI being determined as a function of at least (1) a precoding matrix between the UE and a transmission cell, (2) a channel matrix between the UE and the transmission cell, (3) a system noise, and (4) interference from other transmission cells,
rank transmission cells in a cooperating set in descending order of channel quality and select a first n transmission cells to be included in the subset, and
determine channel quality according to $$CQI_i = CQI\left(\frac{\left\|\sum_{j=1}^{P} h_j^H w_j\right\|}{I+N}\right)$$

wherein $CQI_i$ represents a channel quality indicator in a cooperating scenario i, i represents a cooperating scenario index among a plurality of cooperating scenarios, j represents an index of a transmission cell for a respective cooperating scenario, P represents a number of transmission cells in the cooperating scenario, $w_j$ represents a precoding matrix for communication between the UE and the transmission cell j, $h_j$ represents a channel matrix between the UE and the transmission cell j, I represents interference from other transmission cells than the cooperating set, N represents system noise, CQI(•) represents a channel quality indicator corresponding to a signal to interference plus noise ratio (SINR), $\|\cdot\|$ represents calculation of a norm, and $\cdot^H$ represents a conjugated transposition.

2. The electronic device of claim 1, wherein the message is a feedback message that includes a precoded message indicator (PMI) and the aggregate CQI.

3. The electronic device of claim 2, wherein the feedback message includes PMI fields and CQI fields for respective base stations associated with the plurality of transmission cells.

4. The electronic device of claim 3, wherein the feedback message includes the PMI fields interleaved with the CQI fields.

5. The electronic device of claim 1, wherein the aggregate CQI includes respective signal to noise ratios for the plurality of transmission cells.

6. The electronic device of claim 5, wherein noise in the respective signal to noise ratio includes channel noise and/or interference.

7. The electronic device of claim 1, wherein the processing circuitry is configured to
   rank transmission cells into a cooperating set in descending order of power to the UE in a per-cell mode, and
   determine the subset of CoMP set of transmission cells from N cooperating scenarios, where a first n transmission cells cooperate to provide joint transmission to the UE, where n is a positive integer and N is a number of transmission cells in a cooperating set.

8. The electronic device of claim 7, wherein the processing circuitry includes in the subset of CoMP set of transmission cells only transmission cells having an increment in CQI at or above a predetermined channel quality difference threshold as compared with that for a first transmission cell, and a decrement in CQI below the predetermined channel quality difference as compared with that for the first transmission cell.

9. The electronic device of claim 8, wherein the predetermined channel quality difference threshold is determined based on a performance characteristic of the UE and/or a network spectrum utilization ratio.

10. The electronic device of claim 1, wherein the processing circuitry is configured to rank transmission cells based on a channel quality indicator for respective CQI components of the aggregate CQI.

11. The electronic device of claim 1, wherein the processing circuitry selects the first n transmission cells to be included in the subset by comparing respective channel qualities to a predetermined threshold.

12. A method comprising:
selecting with processing circuitry a plurality of transmission cells as a subset of a coordinated multi-point (CoMP) set of transmission cells used to support wireless communications with a user equipment (UE), wherein
the selecting includes selecting the plurality of transmission cells based on a message from the UE that includes aggregate channel quality information (CQI) for at least two communication channels between the UE and corresponding transmission cells of the plurality of transmission cells, the aggregate CQI being determined as a function of at least (1) a precoding matrix between the UE and a transmission cell, (2) a channel matrix between the UE and the transmission cell, (3) a system noise, and (4) interference from other transmission cells;
ranking transmission cells, by the processing circuitry, in a cooperating set in descending order of channel quality and select a first n transmission cells to be included in the subset; and
determining, by the processing circuitry, channel quality according to $$CQI_i = CQI\left(\frac{\left\|\sum_{j=1}^{P} h_j^H w_j\right\|}{I+N}\right)$$

wherein $CQI_i$ represents a channel quality indicator in a cooperating scenario i, i represents a cooperating scenario index among a plurality of cooperating scenarios, j represents an index of a transmission cell for a respective cooperating scenario, P represents a number of transmission cells in the cooperating scenario, $w_j$ represents a precoding matrix for communication between the UE and the transmission cell j, $h_j$ represents a channel matrix between the UE and the transmission cell j, I represents interference from other transmission cells than the cooperating set, N represents system noise, CQI(•) represents a channel quality indicator corresponding to a signal to interference plus noise ratio (SINR), $\|\cdot\|$ represents calculation of a norm, and $\cdot^H$ represents a conjugated transposition.

13. The method of claim 12, wherein the message is a feedback message that includes a precoded message indicator (PMI) and the aggregate CQI.

14. The method of claim 13, wherein the feedback message includes PMI fields and CQI fields for respective base stations associated with the plurality of transmission cells.

15. The method of claim 14, wherein the feedback message includes the PMI fields interleaved with the CQI fields.

16. The method of claim 12, wherein the aggregate CQI includes respective signal to noise ratios for the plurality of transmission cells.

17. The method of claim 16, wherein noise in the respective signal to noise ratio includes channel noise and/or interference.

18. A non-transitory computer readable storage device having computer readable instructions stored therein that when executed by processing circuitry perform a method, the method comprising:
selecting with the processing circuitry a plurality of transmission cells as a subset of a coordinated multi-point (CoMP) set of transmission cells used to support wireless communications with a user equipment (UE), wherein
the selecting includes selecting the plurality of transmission cells based on a message from the UE that includes aggregate channel quality information (CQI) for at least two communication channels between the UE and corresponding transmission cells of the plurality of transmission cells, the aggregate CQI being determined as a function of at least (1) a precoding matrix between the UE and a transmission cell, (2) a channel matrix between the UE and the transmission cell, (3) a system noise, and (4) interference from other transmission cells;

ranking transmission cells, by the processing circuitry, in a cooperating set in descending order of channel quality and select a first n transmission cells to be included in the subset; and determining, by the processing circuitry, channel quality according to $$CQI_i = CQI\left(\frac{\left\|\sum_{j=1}^{P} h_j^H w_j\right\|}{I+N}\right)$$

wherein $CQI_i$ represents a channel quality indicator in a cooperating scenario i, i represents a cooperating scenario index among a plurality of cooperating scenarios, j represents an index of a transmission cell for a respective cooperating scenario, P represents a number of transmission cells in the cooperating scenario, $w_j$ represents a precoding matrix for communication between the UE and the transmission cell j, $h_j$ represents a channel matrix between the UE and the transmission cell j, I represents interference from other transmission cells than the cooperating set, N represents system noise, $CQI(\bullet)$ represents a channel quality indicator corresponding to a signal to interference plus noise ratio (SINR), $\|\bullet\|$ represents calculation of a norm, and $\bullet^H$ represents a conjugated transposition.

* * * * *